United States Patent

Watanabe et al.

[11] Patent Number: 5,002,149
[45] Date of Patent: Mar. 26, 1991

[54] MOTORCYCLE

[75] Inventors: Tokumaru Watanabe; Takahisa Suzuki, both of Saitama, Japan

[73] Assignee: Honda Giken Kogyo Kabushiki Kaisha, Tokyo, Japan

[21] Appl. No.: 306,740

[22] Filed: Feb. 3, 1989

[30] Foreign Application Priority Data

Feb. 3, 1988 [JP] Japan .................................. 63-23050

[51] Int. Cl.⁵ .............................................. B62K 7/02
[52] U.S. Cl. ................... 180/219; 280/202; 280/288.2; 280/835; 297/DIG. 9
[58] Field of Search ............. 280/202, 288.4, 304.3, 280/304.4, 304.5, 231, 288.2, 288.3, 835; 74/551.1, 551.3; 180/219, 190, 925; 297/DIG. 9

[56] References Cited

U.S. PATENT DOCUMENTS

| Re. 32,063 | 1/1986 | Schultz | 297/DIG. 9 |
|---|---|---|---|
| 1,565,016 | 12/1925 | Lake, Jr. | 297/DIG. 9 |
| 2,448,867 | 9/1948 | Darden | 280/202 |
| 3,481,218 | 12/1969 | Yoshikawa | 74/551.3 |
| 3,935,916 | 2/1976 | Ferraro | 180/219 |
| 4,111,448 | 9/1978 | Sklodowsky | 280/304.4 |
| 4,267,898 | 5/1981 | Wheaton | 180/205 |
| 4,506,753 | 3/1985 | Wood, Jr. | 280/288.2 |
| 4,695,096 | 9/1987 | Kincaid | 297/417 |
| 4,919,479 | 4/1990 | Loewke et al. | 280/202 |

FOREIGN PATENT DOCUMENTS

| 929707 | 6/1955 | Fed. Rep. of Germany . |
|---|---|---|
| 940270 | 3/1956 | Fed. Rep. of Germany . |
| 1115212 | 4/1956 | France . |
| 446521 | 1/1950 | Italy ..................... 280/288.2 |
| 274295 | 7/1927 | United Kingdom ............. 280/202 |

Primary Examiner—Mitchell J. Hill
Attorney, Agent, or Firm—Lyon & Lyon

[57] ABSTRACT

The present invention provides a motorcycle which is characterized by having a pair of handgrips positioned between the steering handle and the driver's seat for grasping by a passenger seated rearwardly of the driver. The passenger, when seated behind the driver, extends his arms to grasp on the handgrips. In this riding position, the passenger is supported by the handgrips as well as his hips and enjoys a stable riding position.

7 Claims, 6 Drawing Sheets

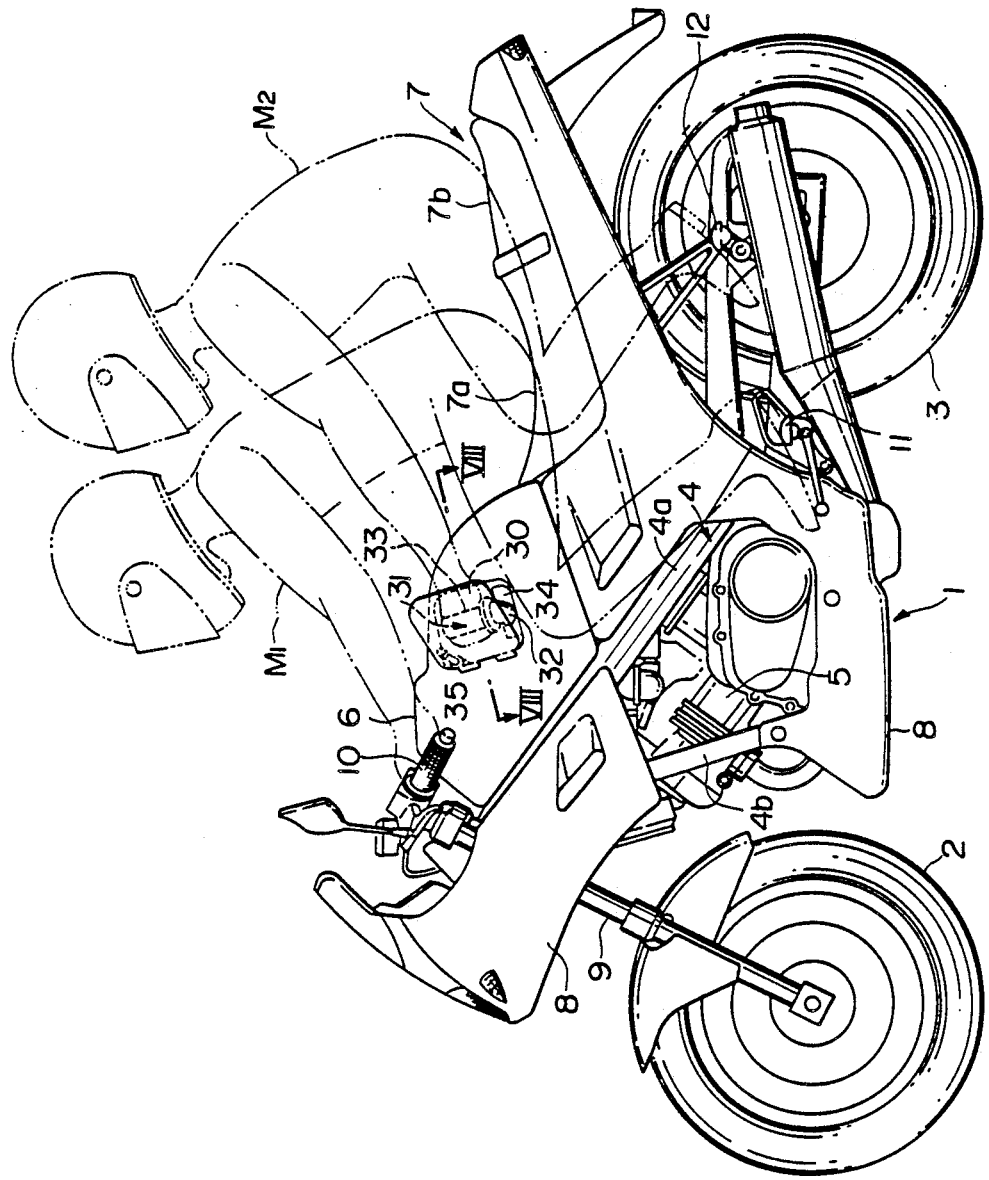

MOTORCYCLE

BACKGROUND OF THE INVENTION

1. Field of the Invention

The invention is related to motorcycles having handgrips for a passenger riding on a motorcycle behind the vehicle operator.

2. Prior Art

Some inventions have been made of motorcycles provided with handgrips for a passenger riding on the motorcycle together with the vehicle operator. One example is presented in Japanese Utility Model Application No. 60-31977 wherein a motorcycle has a passenger's seat between the steering handle operated by the vehicle operator, termed the "driver" herein and the rider's seat, the passenger's hangrips are provided in front of the steering handle. The passenger rides on the passenger's seat, in front of the driver's seat, and extends his arms to hold onto the handgrips in front of the steering handle. This type of conventional handgrip is applicable only to the motorscooters because in such apparatus, the driver must hold the passenger between his arms. Conversely, in other types of vehicles, such as motorcycles, there is no space between the driver and the handle for the passenger.

Another example is presented in Japanses Utility Model Application 61-171678, which provides a motorcycle having a passenger's seat behind the driver's seat, and handgrips between the driver's seat and the passenger's seat. This invention is applicable not only to motorscooters but also to ordinary motorcycles because the passenger sits behind the driver. A problem with conventional handgrips, however, is that the passenger is obliged to bend his arms because the handgrips are very close to the passenger's seat. Consequently, this riding positioned disrupts the passenger's feeling of unity with the motorcycle.

SUMMARY OF THE INVENTION

An object of the present invention is, therefore, to provide a motorcycle whereby the passenger riding behind the driver can have a feeling of riding in unity with the motorcycle. According to an aspect of the present invention, there is provided a motorcycle having a passenger's seat behind the driver's seat, and passenger's hand grips attached to the motorcycle in front of the driver's seat.

In a second aspect of the present invention, there is provided a motorcycle having a passenger's seat behind the driver's seat, and passenger's handgrips retractably attached to the motorcycle so that the handgrip comes between the handle and the driver's seat when extended and is closely fitted to the side of the motorcycle when retracted.

In a third aspect of the present invention, there is provided a motorcycle having a passenger's seat behind the driver's seat and passenger's handgrips attached to the motorcycle between the driver's seat and the handle. The passenger's handgrips are retractable and they are hidden in lids attached to the body when they are retracted.

Other objects and embodiments of the present invention will be made clear according to the following description.

BRIEF DESCRIPTION OF THE DRAWINGS

FIG. 6 is a side view of a motorcycle according to the third embodiment of the present invention.

DETAILED DESCRIPTION OF THE PREFERRED EMBODIMENTS

Figure 1:
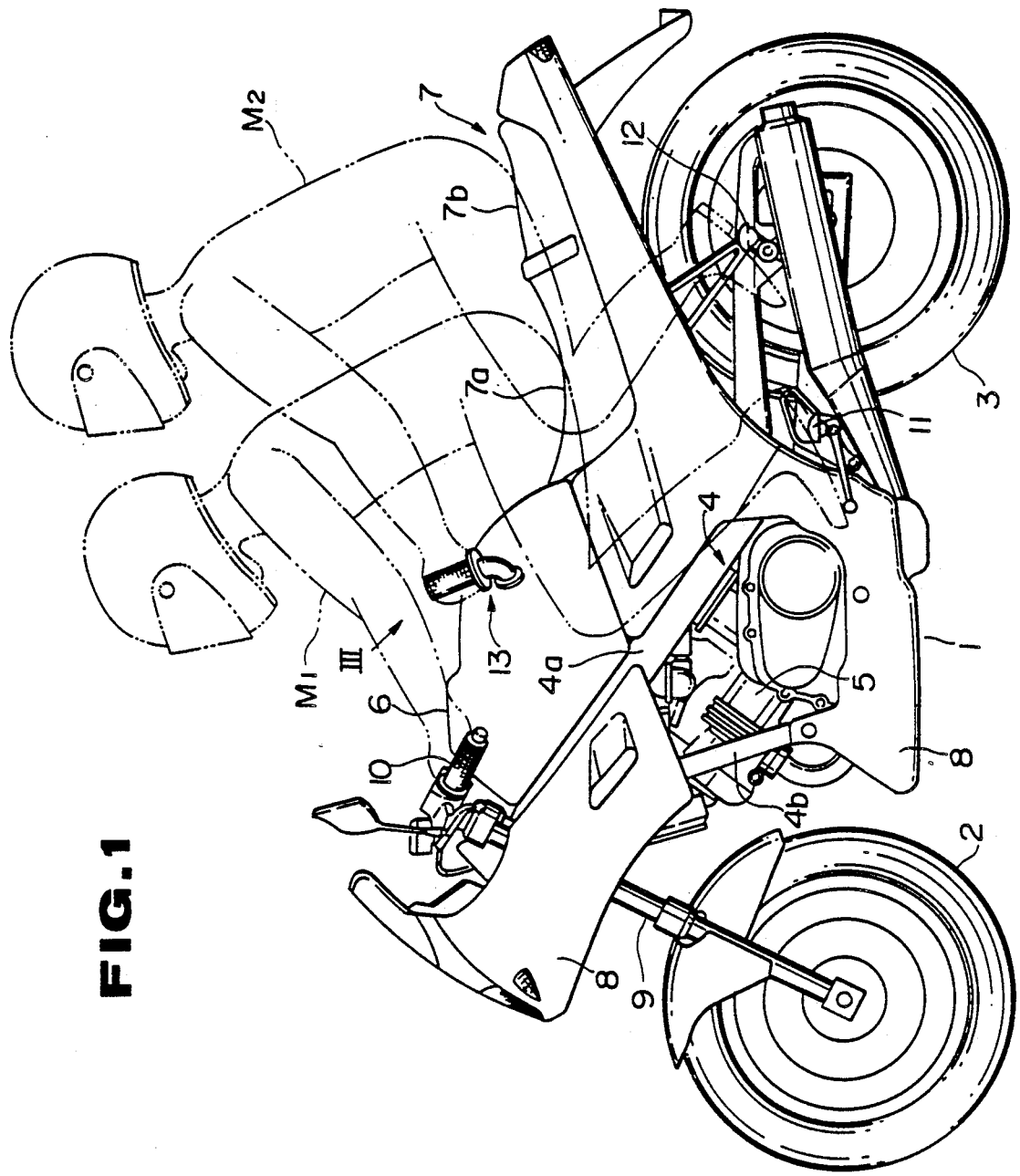
FIG. 1 is a side view of a motorcycle according to the first embodiment of the present invention.
Figure 2:
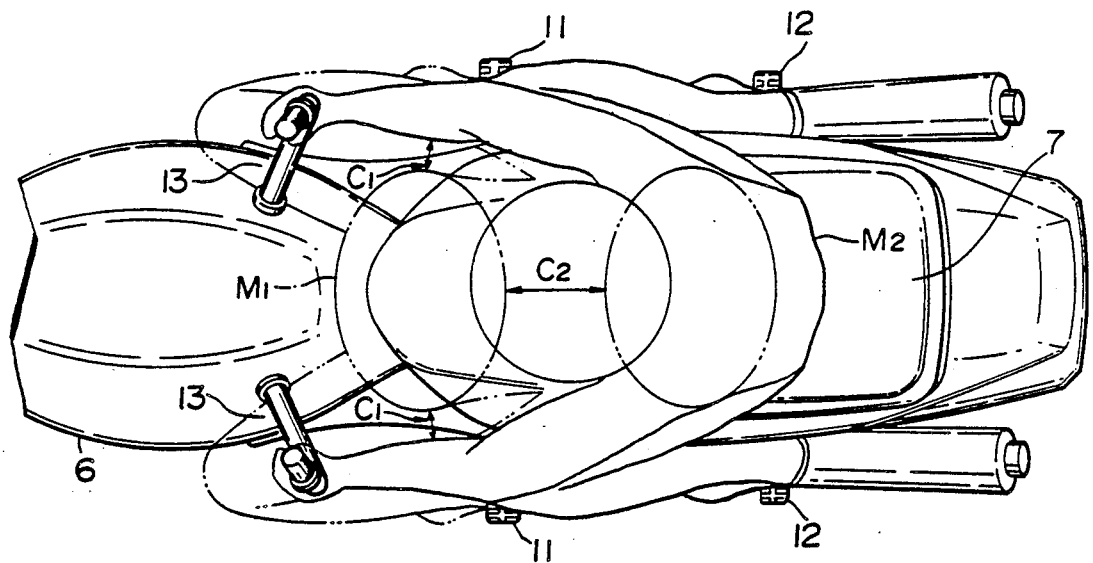
FIG 2 is a horizontal view of a motorcycle according to the first embodiment of the present inventon.
Figure 3:
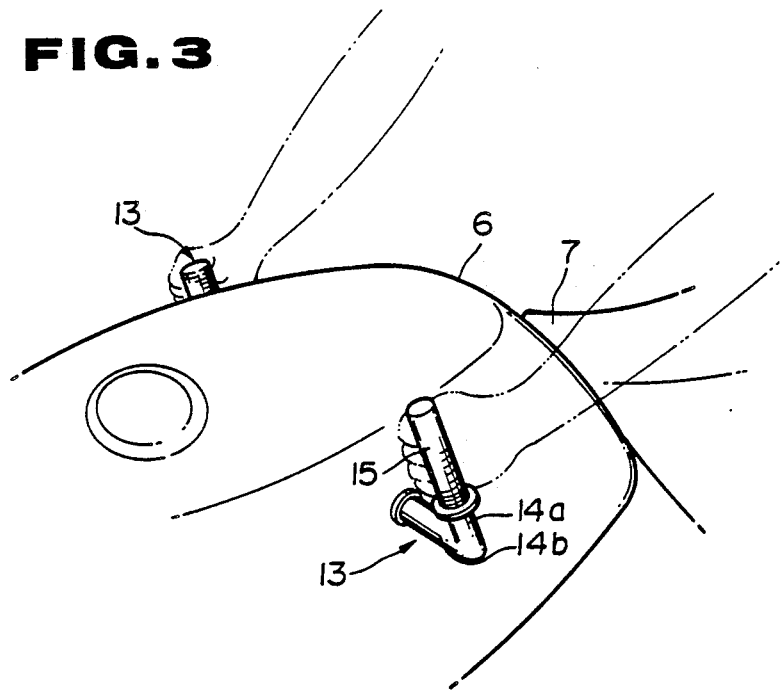
FIG. 3 is a close-up perspective view of the passenger's handgrips according to the first embodiment of the present invention.

FIGS. 1 through 3 show the first preferred embodiment of the present invention. The motorcycle 1 comprises the front wheel 2, front fork 9 supporting the front wheel 2, fairing 8 covering the front part of the motorcycle 1, frame 4, and rear wheel 3. The frame is composed of a main frame 4a to which front fork 9 is rotatably attached and down tubes 4b. The engine 5 is located between the down tubes 4b and supported by the frame 4. The steering 10 is attached to the front fork 9 at the top end thereof. The fuel tank 6 and seat 7 are mounted on the main frame 4. The seat is divided into two parts: the front part of seat 7 is the driver's seat 7a; the rear part of seat 7 is the passenger's seat 7b. There are a pair of foot rests 11 on the sides of the motorcycle between engine 5 and rear wheel 3. The passenger's foot rests 12 are disposed near the drive shaft of rear wheel 3.

On the mid-rear sides of fuel tank 6, a pair of passenger's handgrips 13 are attached. The handgrip 13 comprises an L-shaped tublar member attached to fuel tank 6 at one end by welding or by nuts and bolts. The tubular member 14 is mainly composed of horizontal member 14b extending generally laterally outwardly from fuel tank 6 and vertical member 14a attached to the distal end of horizontal member 14a and extending upwardly therefrom. The upper part of vertical members 14a are covered by rubbergrip 15. The vertical member 14a is inclined slightly forwardly and inwardly so as to provide a natural grip feeling to the passenger. The tubular member 14 may be made of a unitary construction or the horizontal member 14b and the vertical member 14e may be welded to each other.

The riding positions of the driver M1 and passenger M2 are shown by dotted lines in FIG. 1. The driver rides on the driver's seat holding the handle 10 and resting his feet on the foot rests 11. FIG. 1 also shows the riding position of the passenger M2. The passenger rides on the passenger's seat 7b resting his feet on the passenger's foot rest 12. The passenger grips the passenger's handgrips 13 by extending his arms on both sides of the driver. The arms of the passenger M2 extend forward of the driver M1 so as to hold the driver in a spaced relation and the arms are slightly bent at the elbows to enable movement of the passenger relative to the motorcycle. The passenger's handgrips 13 are so located as to keep the passenge M2 at a stable and well-balanced riding position. A space is maintained between the driver's body and the passenger's body so as not to restrict their motions.

When the driver M1 and the passenger M2 are in the riding position as shown by FIG. 1, the passenger's hip, shoulder and the handgrip 13 form a triangle and provide good support for the passenger. The riding position of the passenger M2 is then similar to that of the driver M1. When the motorcycle is accelerated or slowed down, the passenger can support himself by the handgrips 13 and does not disturb the driver by pushing or pulling him. A strong support is always provided to the passenger because of the riding position. Because the handgrips 13 are attached to the fuel tank 6, the passenger M2 can bank together with the motorcycle easily. Further, as a distance C2 is maintained between the passenger and the driver (FIG. 2), the passenger does not disturb the driver by clinging thereto. In brief, the passenger can enjoy the feeling of riding in unity with the motorcycle.

The handgrips 13 may have switches to be operated by the passenger. When the passenger wants to stop or to slow down the motorcycle, an indicator located in front of the driver shows the operation of the switch. Thus, the communication of the driver and the passenger is also improved.

Figure 4:
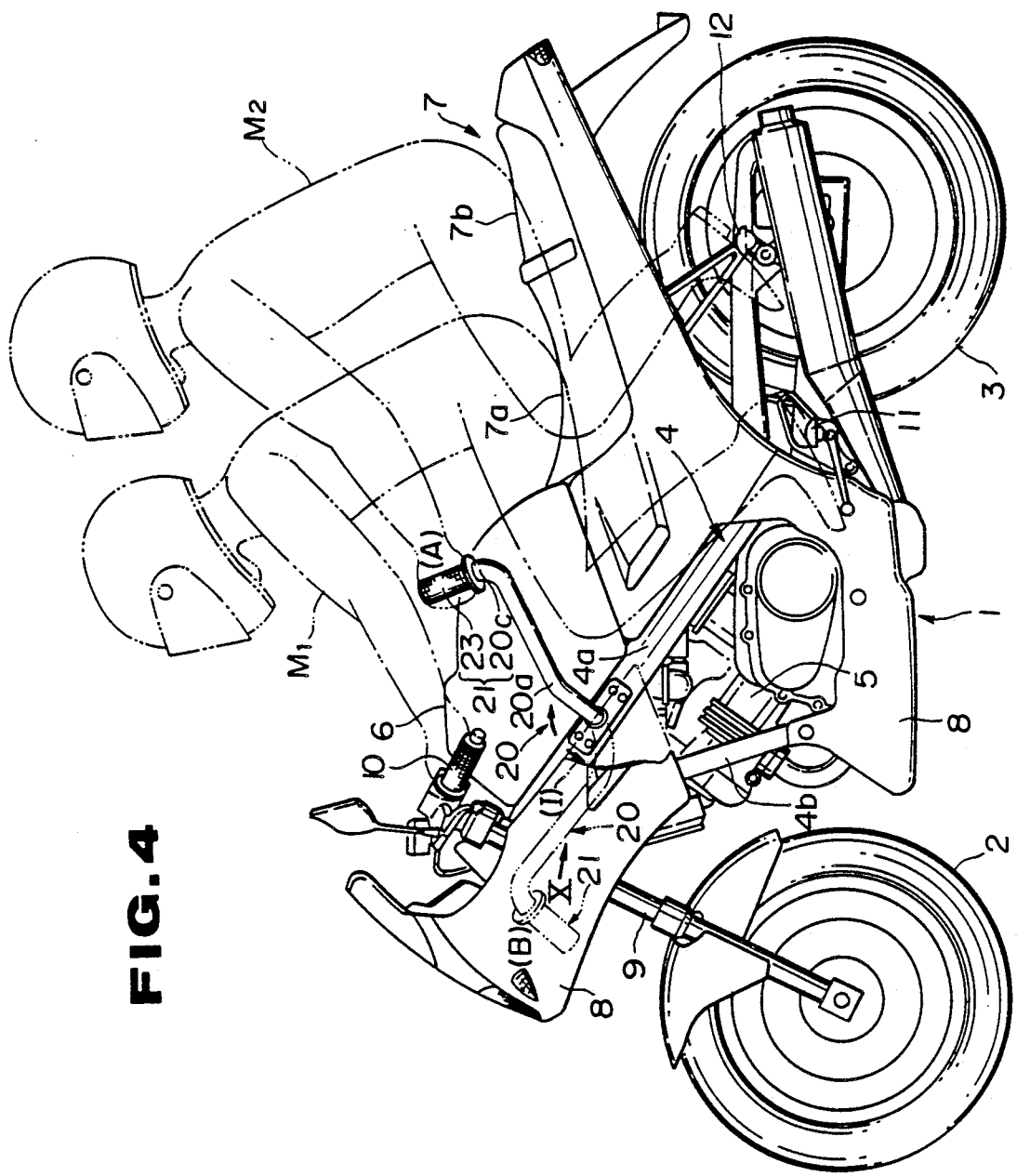
FIG. 4 is a side view of a motorcycle according to the second embodiment of the present invention.
Figure 5:
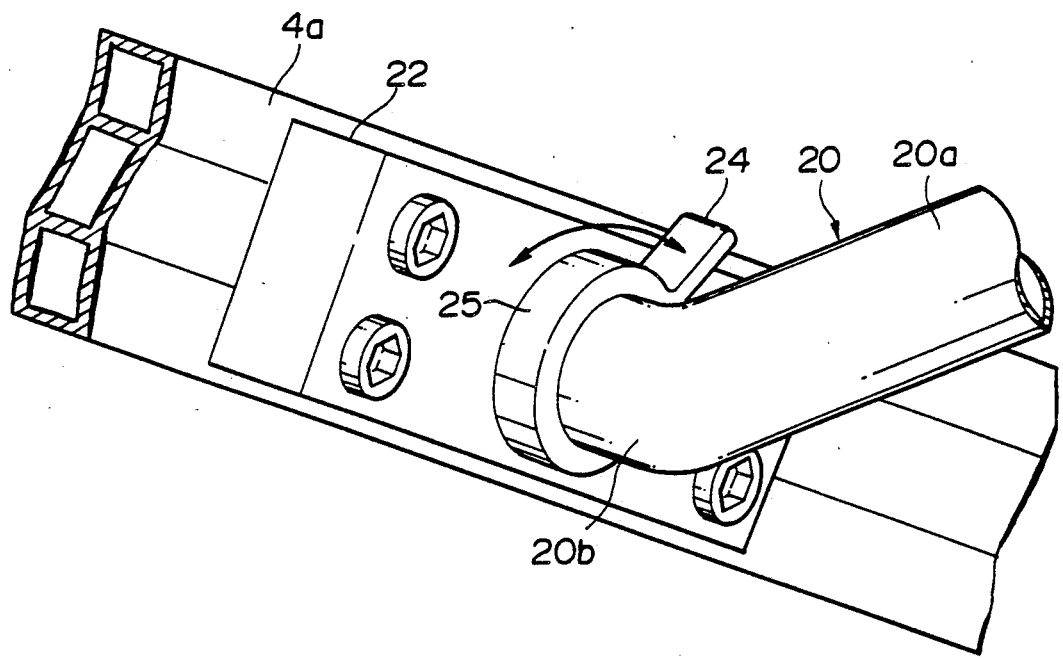
FIG. 5 shows in detail how the passenger's handgrips are attached to the frame of the motorcycle according to the second embodiment of the invention.

FIGS. 4 and 5 show a second embodiment of the present invention. According to the second embodiment, a pair of hand grips 20 are attached to the main frame 4a of the motorcycle. The handgrip 20 comprises a tube member 20a and a grip portion 21 attached to the distal end of tube member 20a. A bracket 22 is fixed to main frame 4a and an attachment ring 24 is rotatably secured on the bracket 22. The proximate end 20b of the tube member 20a of the handgrip 20 is inserted into the attachment ring 24. The attachment ring 24 has a knob formed in unitary construction theretogether so as to easily rotate the ring. When the knob is rotated to its rear position as shown in FIG. 5, the handgrip 20 is firmly secured to the bracket 22 and, therefore, to the motorcycle. Consequently, handgrips 20 are extended and grip portions 21 are positioned away from fuel tank 6, between the driver and the handle and provide a good hand support for the passenger. The grip portions 21 are inclined slightly inwardly and forwardly. In a modified embodiment, grip portions 21 may be approximately parallel to the handle 10.

When the knob is rotated to its forward position, the meshing of the attachment ring 24 and th bracket 22 is released and the tube member 20a becomes pivotable about its proximate end 20b. When the attachment ring 24 is released, the handgrip 20 is movable between the retracted position (shown by dotted lines in FIG. 4) and the extended position (shown by solid lines in FIG. 4). When handgrips 20 are not necessary, for example, when only a driver is riding the motorcycle, the handgrips 20 are kept at the retracted position and holding portions 21 are enclosed in the fairing 8.

The tube member 20 may comprise several coaxial tubes slidable one to the other so as to be extensible. In this case, the height of the grip portions 21 is changeable by changing the length of the tube member 20a.

Figure 7:
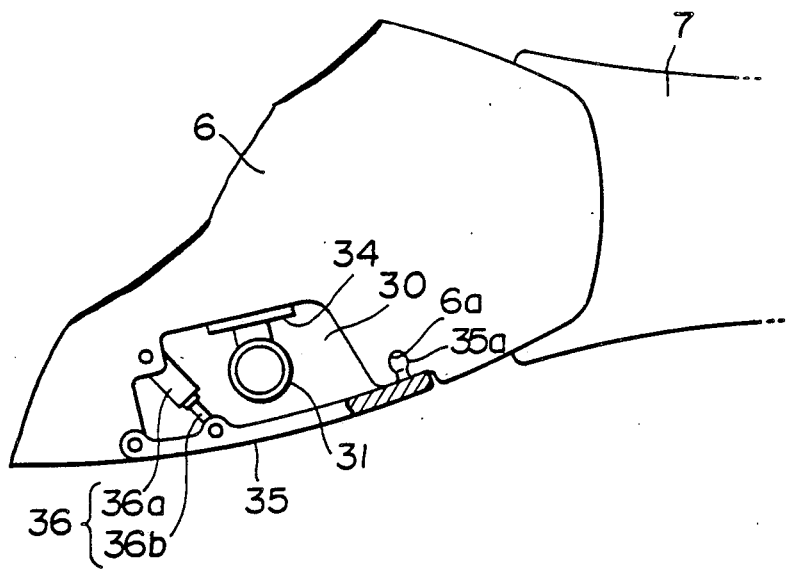
FIGS. 7 and 8 are cross-sections showing the operation of a lid for covering the passenger's handgrips.
Figure 8:
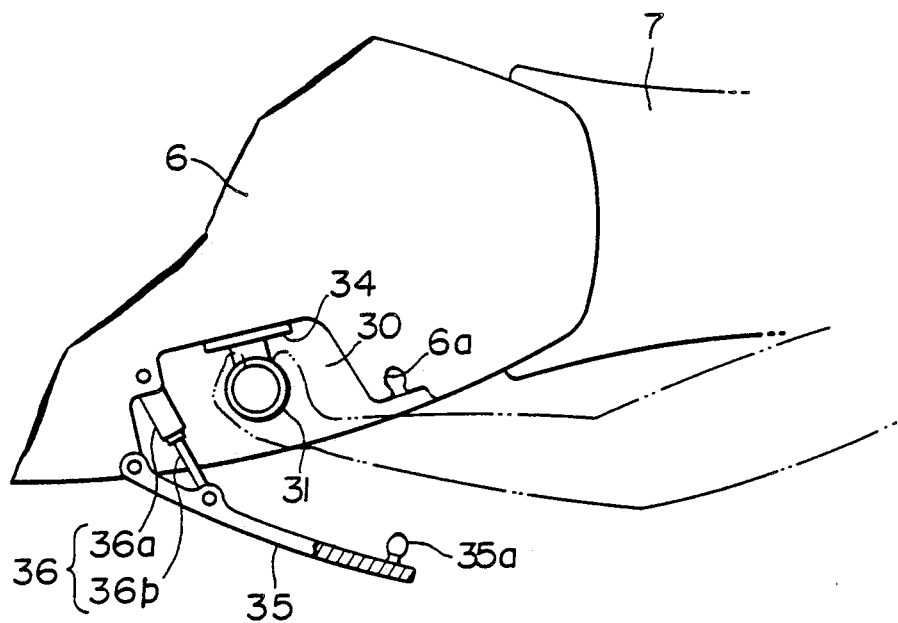

FIGS. 6 through 8 show a third preferred embodiment. According to this embodiment, a pair of concavities 30 are formed at both sides of the fuel tank 6 and handgrips 31 are disposed in the concavities 30. Lids 31 are pivotally attached to the fuel tank 6 so as to cover the concavities 30. A lid closing device 36 is disposed to connect the fuel tank 6 and the lid 35 and to give a restoring force and a damping force when the lid is being opened and closed. A hook means 35a is attached at the distal end of the lid 35 and a receiving means 6a is formed in the fuel tank. The hook means 35a is inserted into the receiving means when the lid 35 is closed and prevents the lid from being opened inadvertently. The lid closer device 36 comprises a cylindrical portion 36a and a tie rod 36b which is slidably inserted in the cylindrical portion 36a. The lid closing device 36 includes a click stop mechanism so that the lid is held at the opened position against the force of wind which may be exerted while the motorcycle is running.

When the passenger holds on the handgrips 31, the lids 35 are opened by hand against the engagement of the hook means 35a and the receiving means 6a. Once the lid is fully opened as shown in FIG. 8, the lid is held at the position by means of lid closer device 36 as mentioned above. The lid 35 prevents the hand of the passenger holding the handgrips 31 form being exposed to the wind and rain and, therefore, provides further comfortable riding thereto. When the handgrips 31 are not needed, the lids 35 are closed. When the lids 35 are in the closed position, the handgrips 31 are not seen from outside, and the fuel tank 6 looks just like an ordinary fuel tank.

Figure 9:
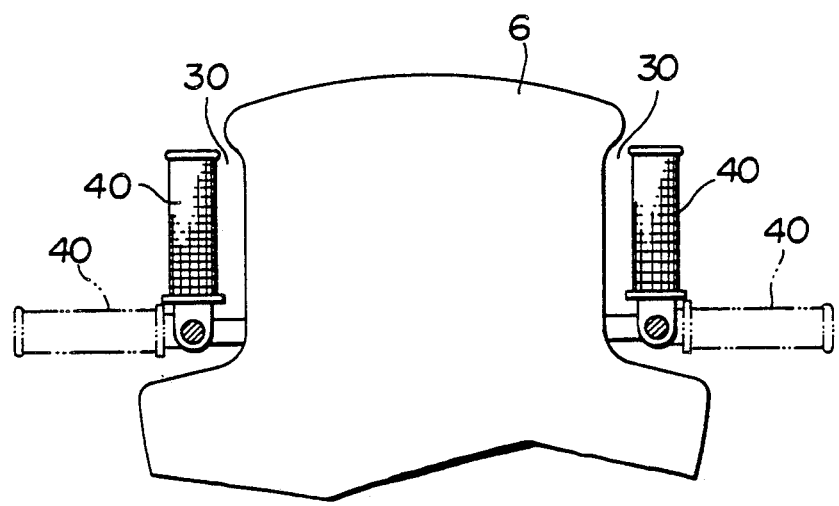
FIG. 9 is a cross-section showing the passenger's handgrips according to the third embodiment of the invention.

The handgrips 31 may be retractable as shown in FIG. 9. When the handgrips 31 are retracted to its upright position, the handgrips are installed in the concavity formed in the fuel tank 6. When the handgrips 31 are used, they are extended to the horizontal position as shown by the dotted lines in FIG. 9. In the above embodiments, the fuel tank may not be provided with the lids.

As described above in detail, the present invention provides a passenger with a feeling of riding a motorcycle in unity with the motocycle. A stable and well equilibrated riding position is assured to the passenger by virtue of the present invention. Both the passenger and the driver can enjoy riding without unnecessarily interfering with each other.

What is claimed is:
1. A motorcycle comprising:
(a) a steering handle for operation by a driver;
(b) a driver's seat located behind the steering handle;
(c) a passenger's seat located behind the driver's seat;
(d) a fuel tank between the driver's seat and the steering handle, and
(e) passenger's handgrips attached to the fuel tank.

2. A motorcycle according to claim 1 wherein the passenger's handgrips are approximately L-shaped having horizontal portions extending horizontally outwardly from the fuel tank and vertical portions extending vertically from distal ends of the horizontal portions, the vertical portions being inclined slightly inwardly and forwardly.

3. A motorcycle according to claim 1 wherein a pair of concavities are formed in both sides of the fuel tank and the passenger's handgrips are attached to the fuel tank at the respective concavities.

4. A motorcycle according to claim 3 wherein the passenger's handgrips are pivotally attached to the fuel tank so as to be pivotally movable between an upright position and a horizontal position.

5. A motorcycle according to claim 3 wherein lids are provided on the fuel tank so as to cover the concavities and the handgrips when the lids are closed.

6. A motorcycle according to claim 4 wherein lids are provided to the fuel tank so as to cover the concavities and the handgrips when the lids are closed.

7. A motorcycle comprising:
(a) a steering handle for operation by a driver;
(b) a driver's seat located behind the steering handle;
(c) a passenger's seat located behind the driver's seat; and
(d) passenger's handgrips attached to the motorcycle and located between the driver's seat and the steering handle wherein the motorcycle further includes a fuel tank between the driver's seat and the steering handle, a main frame supporting the fuel tank and the driver's and passenger's seats and a fairing covering a front portion of the motorcycle, the passenger's handgrips being pivotally attached to the main frame so as to be pivotable between an extended position and a retracted position, the handgrips being between the steering handle and the driver's seat so as to provide good support in the extended position to a passenger, the handgrips in the retracted position being enclosed in the fairing so as not to impede the driver's movement.

* * * * *